United States Patent [19]

Okuda et al.

[11] 4,119,596
[45] Oct. 10, 1978

[54] THERMOSETTING COATING COMPOSITIONS

[75] Inventors: Takao Okuda, Yokohama; Akira Wada, Kamakura, both of Japan

[73] Assignee: Nippon Zeon Co. Ltd., Tokyo, Japan

[21] Appl. No.: 795,369

[22] Filed: May 9, 1977

[30] Foreign Application Priority Data

May 17, 1976 [JP] Japan ................... 51-56374

[51] Int. Cl.$^2$ .............. C08L 91/00; C08L 61/24; C08L 61/28
[52] U.S. Cl. ................... 260/21; 260/850; 260/852; 260/854; 260/856; 260/834; 427/388 B
[58] Field of Search ............. 260/21, 850, 852, 854

[56] References Cited

U.S. PATENT DOCUMENTS

| 2,574,741 | 11/1951 | Hunt et al. | 260/852 |
| 3,496,129 | 2/1970 | Wisner et al. | 260/854 |
| 3,557,033 | 1/1971 | Brinton | 260/850 |

Primary Examiner—John C. Bleutge
Attorney, Agent, or Firm—Sherman & Shalloway

[57] ABSTRACT

In a thermosetting coating composition comprising at least one thermosetting resin selected from aminoalkyd resins and aminoacrylic resins as a main ingredient of a vehicle, the improvement wherein the composition contains 100 parts by weight of the thermosetting resin and 5 to 50 parts by weight of a cyclopentadiene-derived hydrocarbon resin having a softening point of 50° to 160° C. and obtained by heat polymerizing a mixture of 85 to 55% by weight of a cyclopentadiene-type monomer with 15 to 45% by weight of a polar monolefinic monomer copolymerizable therewith.

The compositions have improved flexibility, impact strength and adhesion and are useful as vehicles for thermosetting oil-base paints.

10 Claims, No Drawings

THERMOSETTING COATING COMPOSITIONS

This invention relates to novel thermosetting coating compositions. More specifically, it relates to novel thermosetting coating compositions having improved flexibility, impact strength and adhesion which comprises blends of aminoalkyd resins or aminoacrylic resins with cyclopentadiene-derived hydrocarbon resins.

Various thermosetting resins such as alkyd resins, acrylic resins or amino resins have been used heretofore as vehicles for thermosetting oil-base paints. When used singly, however, these resins do not always show satisfactory properties. For example, the amino resins have superior hardness, but are brittle and inferior in adhesion to substrates. The alkyd resins or acrylic resins have good flexibility and adhesion, but poor hardness. In order to utilize the desirable properties of these resins, it has been the previous practice to use them in admixture, and aminoalkyd paints or aminoacrylic paints composed of a mixture of 80 to 60% by weight of an alkyd resin or acrylic resin with 20 to 40% by weight of an amino resin have gained general acceptance.

The aminoalkyd resin paints or aminoacrylic resin paints have better gloss, gloss retention and hardness than ordinary room temperature curable paints such as usual oil-base paints, paints prepared from mixtures of synthetic resins, epoxy resin paints and urethane resin paints, but their flexibility, impact strength and adhesion are not entirely satisfactory. This deflect can be somewhat remedied by decreasing the proportion of the amino resin, but at a sacrifice of gloss or hardness. Addition of an epoxy resin is effective for increasing their adhesion to substrates, but since the epoxy resin adversely affects gloss retention, the resulting paints are limited to primer coating uses.

It is an object of this invention therefore to provide a thermosetting coating composition having improved flexibility, impact strength and adhesion.

Another object of this invention is to provide a thermosetting coating composition having superior gloss, weatherability and hardness.

We have worked extensively on the improvement of the flexibility, impact strength, and adhesion of coated films of aminoalkyd resin paints and aminoacrylic resin paints without impairing their characteristic gloss, gloss retention and hardness, and found that this can be effectively accomplished by incorporating specific cyclopentadiene-derived hydrocarbon resins in these resins.

According to the present invention, there is provided an improved thermosetting coating composition which consists of (i) 100 parts by weight of at least one thermosetting resin selected from the group of aminoalkyd resins and aminoacrylic resins as a main ingredient of a vehicle, and (ii) 5 to 50 parts by weight of a cyclopentadiene-derived hydrocarbon resin obtained by polymerizing under heat a mixture of 85 to 55% by weight of a cyclopentadiene-type monomer and 15 to 45% by weight of a polar monolefinic monomer copolymerizable therewith, and if desired, (iii) conventional additives such as pigments, solvents, and curing promoters.

The cyclopentadiene-derived hydrocarbon resin (ii) used in the invention is a hydrocarbon resin having a softening point of 50° to 160° C., preferably 60° to 100° C., and a Gardner color number of not more than 10 which is obtained by polymerizing a monomeric mixture consisting of 85 to 55% by weight, preferably 80 to 60% by weight, of a cyclopentadiene-type monomer and 15 to 45% by weight, preferably 20 to 40% by weight, of a polar monolefinic monomer in the absence of a non-radical catalyst such as a cationic catalyst at 200° to 300° C., preferably 250° to 280° C., for 0.5 to 20 hours, preferably 1 to 10 hours, in the presence or absence of an inert hydrocarbon solvent such as benzene, toluene or xylene in an autoclave, and then removing the unreacted monomers and the solvent by conventional means for polymer purification such as distillation. Products of reduced coloration and improved weatherability obtained by hydrogenating these cyclopentadiene-derived hydrocarbon resins in a customary manner, and modification products of these hydrocarbon resins obtained by adding an ethylenically unsaturated carboxylic compound typified by maleic anhydride can also be used as the cyclopentadiene-derived hydrocabon resin (ii).

If the amount of the cyclopentadiene-type monomer is too large, the resulting cyclopentadiene-derived hydrocarbon resin does not have sufficient compatibility with thermosetting resins, and the flexibility, impact strength and water resistance of coated films from the resins composition are poor. If, on the other hand, the amount of the cyclopentadiene-type monomer is too small, the cyclopentadienederived hydrocarbon resin has too low a softening point. For this reason, coated films obtained from a resin composition prepared by blending it with a thermosetting resin have poor hardness and water resistance. When the softening point of the cyclopentadiene-derived hydrocarbon resin is too high, the resin has poor compatability with thermoplastic resins.

The cyclopentadiene-type monomer denotes a monomer having a cyclopentadiene skeleton, and includes cyclopentadiene, lower alkyl (e.g., methyl or ethyl)-substituted cyclopentadienes, and their Diels-Alder adducts of low degrees of polymerization, such as dimers, trimers or codimers. Since cyclopentadiene is present stably as dicyclopentadiene at room temperature, cyclopentadiene and dicyclopentadiene are usually dealt with quite similarly.

The polar monolefinic monomer is a vinyl monomer having a polar group. Examples of this monomer are organic unsaturated cyanide compounds such as acrylonitrile or methacrylonitrile; organic unsaturated chlorine compounds such as vinyl chloride and allyl chloride; lower fatty acid esters of unsaturated alcohols such as vinyl acetate, vinyl propionate, allyl acetate, methallyl acetate, allyl propionate or methallyl propionate; unsaturated carboxylic acids such as acrylic acid or methacrylic acids; ester derived from the above-exemplified unsaturated carboxylic acids and lower alcohols such as methyl alcohol, ethyl alcohol, butyl alcohol, glycide or ethylene glycol; unsaturated aldehydes such as acrolein or methacrolein; mono- or polyhyric unsaturated alcohols such as allyl alcohol, crotyl alcohol, 1,4-butenediol, or 3-hexane-2,5-diol; and unsaturated ethers such as allyl glycidyl ether. The vinyl acetate, methyl methacrylate and allyl alcohols are especially preferred.

In the preparation of the cyclopentadiene-derived hydrocarbon resin (ii), an unsaturated monomer not containing a polar group, such as styrene, ethylene, propylene, butene, pentene, cyclopentene, 1,3-butadiene, isoprene, or 1,3-pentadiene, may be used together in amounts which do not essentially impair the advantages of this invention.

The thermosetting resin (i) means aminoalkyd resins or aminoacrylic resins which are generally used as vehicles for thermosetting coating compositions. These resins can be easily obtained in a customary manner by mixing 80 to 60% by weight, preferably 75 to 65% by weight, of alkyd resins or acrylic resin with 20 to 40% by weight, preferably 25 to 35% by weight, of amino resins.

Specific examples of alkyd resins are short oil or medium oil alkyd resins modified with coconut oil, rice bran oil, soybean oil or linseed oil. Examples of the acrylic resins are polymers containing as a major unit an acrylic monomer such as acrylic acid, methacrylic acid or esters of these, and copolymers of these monomers with comonomers such as styrene, which may contain a reactive functional group such as carboxyl, hydroxyl, amino, methylol, epoxy or glycidyl group in the side chains.

The amino resins include, for example, melamine resins derived from melamine, formaldehyde and alcohols, benzoguanamine resins derived from benzoguanamine and alcohols, and urea resins derived from urea, formaldehyde and alcohols. Usually, butylated melamine resins, butylated benzoguanamine resins and butylated urea resins are preferably used.

It is essential in the present invention that 100 parts by weight of the thermosetting resin (i) be blended with 5 to 50 parts by weight, preferably 10 to 30 parts by weight, of the cyclopentadiene-derived hydrocarbon resin (ii). Too small an amount of the cyclopentadiene-derived hydrocarbon resin will reduce the effect of improving the flexibility, impact strength and adhesion of coated films from the blended resin composition. On the other hand, too much cyclopentadiene-type hydrocarbon resin results in reduced hardness of the coated films.

In the practice of the present invention, the thermosetting resin (i) and the cyclopentadiene-derived hydrocarbon resin (ii) are dissolved in a customary solvent such as toluene, xylene, mineral spirit, ethyl acetate, butyl acetate, ethyl Cellosolve, methyl ethyl ketone or methyl isobutyl ketone, and if desired, another vehicle such as an epoxy resin, a pigment or filler such as titanium oxide, calcium carbonate, gypsum or talc, and a curing promoter such as phosphoric acid are added as needed, to form the desired coating composition. The composition is coated on a substrate by usual methods such as brush coating, or spray coating. The composition applied is then heat cured at 100° to 200° C., preferably 120° to 170° C., for 10 to 60 minutes, preferably 20 to 40 minutes to afford a coated film having superior flexiblity, impact strength, adhesion, gloss and hardness.

The following examples illustrate the present invention more specifically. All parts and percentages in the examples are by weight unless otherwise specified.

EXAMPLE 1

A mixture of dicyclopentadiene and vinyl acetate was heat polymerized at 260° C. for 3 hours in the presence of xylene as a solvent. The resulting hydrocarbon resin was mixed with an alkyd resin, an aminoresin and other ingredients in accordance with the following formulation. The ingredients were fully mixed in a ball mill, and coated on a mild steel panel treated with zinc phosphate by means of a bar coater having piano wires with a diameter of 1 mm. The coated panel was allowed to stand for 20 minutes at room temperature, and the coating was baked for 30 minutes in a heated oven at 130° C. to afford a cured coated film having a thickness of 30 ± 3μ. The properties of the coated film was evaluated in accordance with JIS K-5400. The results are shown in Table 1.

| Formulation | |
|---|---|
| Cyclopentadiene-derived hydrocarbon resin | 20 parts |
| Soybean-modified alkyd resin (*1) | 70 |
| Butylated melamine resin (*2) | 30 |
| Titanium oxide (*3) | 120 |
| Xylene | 160 |
| Solids concentration | 60 % |
| Vehicle/pigment ration | 1/1 |
| Weight ratio of the aminoalkyd resin/cyclopentadiene-derived resin | 100/20 |
| Weight ratio of the alkyd resin/melamine resin | 70/30 |

(*1) Beckosol 1307 EL (a product of Dainippon Ink and Chemicals, Inc.)
(*2) Superbeckamin J-820-60 (a product of Dainippon Ink and Chemical, Inc.)
(*3) Tipake R-630 (a product of Ishihara Sangyo Co., Ltd.)

Table 1

| Run No. | Invention | | | Comparison | | | |
|---|---|---|---|---|---|---|---|
| | 1 | 2 | 3 | 4 | 5 | 6 | 7 |
| Cyclopentadiene-derived hydrocarbon resin | | | | | | | |
| Vinyl acetate (%) | 20 | 30 | 40 | — | 10 | 20 | 60 |
| Dicyclopentadiene (%) | 80 | 70 | 60 | — | 90 | 80 | 40 |
| Softening point (° C) | 95 | 90 | 74 | — | 89 | 175 | 48 |
| Properties of the coated films | | | | | | | |
| Condition of the coated film | Good | Good | Good | Good | The cyclopentadiene-derived hydrocarbon resin was not miscible with the amino alkyd resin. | The cyclopentadiene-derived hydrocarbon resin was not miscible with the amino alkyd resin. | Good |
| Crosscut tape test | 100/100 | 100/100 | 100/100 | 65/100 | | | 100/100 |
| Pencil hardness | 2H | 2H | 2H | 2H | | | B |
| Bending test (mm) | 6 | 3 | 3 | 10 (not acceptable) | | | 3 |
| Impact test (½ inch × g × mm) | 1000×500 | 1000×500 | 1000×500 | 500×400 | | | 500 |
| Erichsen (mm) | 5.2 | 6.3 | 7.1 | 3.8 | | | >8.0 |
| Water resistance (40° C, 10 days) | ++ | ++ | ++ | ++ | | | + |
| Alkali resistance (5% Na₂CO₃ aqueous solution, 25° C, 10 days) | ++ | ++ | ++ | ++ | | | ++ |
| Gasoline resistance (Gasoline No. 2, 25° C, 6 hours) | ++ | ++ | ++ | ++ | | | ++ |
| Gloss (glossmeter) | 91.2 | 93.5 | 89.3 | 84.7 | | | 86.7 |
| Gloss retention (%) after 300 hour exposure to weather-O-meter (weatherability) | 98.3 | 98.6 | 98.1 | 95.7 | | | 96.2 |

The results of the tests for water resistance, alkali resistance and gasoline resistance were evaluated on a scale of three grades in which (+ +) means that no change occurred in the appearance of the coated films;

(+) means that some cloudiness or small swellings appeared; and (−) means that marked cloudiness appeared in the coated films, or the coated films were swollen or peeled. The same standards of evaluation are used throughout the present application.

It can be seen from the results that the compositions of this invention had better flexibility than the composition not containing a cyclopentadiene-derived hydrocarbon resin (Run No. 4) as seen from the results of the bending test and the Erichsen test, and had improved impact strength, gloss, gloss retention (weatherability) and adhesion (crosscut tape test). The cyclopentadiene-derived hydrocarbon resin containing 10% of a vinyl acetate unit (Run No. 5), and the cyclopentadiene-derived hydrocarbon resin having a softening point of more than 170° C. (Run No. 6) were not miscible with the amino resin or alkyd resin. The composition containing the cyclopentadiene-derived hydrocarbon resin having a softening point of less than 50° C. (Run No. 7) gives coated films having low hardness and water resistance.

EXAMPLE 2

Using the same cyclopentadiene-derived hydrocarbon resin as in Run No. 2 of Example 1, compositions were prepared in accordance with the formulations shown in Table 2. The properties of coated films prepared from these compositions were evaluated in the same way as in Example 1. The results are shown in Table 2.

Table 2

| Run No. | Invention | | | Comparison | |
|---|---|---|---|---|---|
| | 2 | 3 | 4 | 1 | 5 |
| Cyclopentadiene-derived resin (solids 100%) | 5 | 20 | 40 | 0 | 60 |
| Alkyd resin (solids 50%) | 140 | 140 | 140 | 140 | 140 |
| Butylated melamine resin (solids 60%) | 50 | 50 | 50 | 50 | 50 |
| Titanium oxide | 105 | 120 | 150 | 100 | 160 |
| Xylene | 50 | 70 | 110 | 43 | 124 |
| Cyclopentadiene resin/alkydmelamine resins | 5/100 | 20/100 | 40/100 | 0/100 | 60/100 |
| Pigment/vehicle | 1/1 | 1/1 | 1/1 | 1/1 | 1/1 |
| Solids content (%) | 60 | 60 | 60 | 60 | 60 |
| Properties of the coated films | | | | | |
| Condition of the coated film | Good | Good | Good | Good | Good |
| Crosscut tape test | 100/100 | 100/100 | 100/100 | 65/100 | 85/100 |
| Pencil hardness | 2H | 2H | 2H | 2H | 2H |
| Bending test | 6 | 3 | 8 | 10 (unacceptable) | 10 (unacceptable) |
| Impact test Erichsen test | 500×500 | 1000×500 | 500×500 | 500×400 | 500×300 |
| Water resistance | 4.9 | 6.3 | 4.5 | 3.8 | 2.2 |
| Alkali resistance | ++ | ++ | ++ | ++ | ++ |
| Gasoline resistance | ++ | ++ | ++ | ++ | ++ |
| Gloss | ++ | ++ | ++ | ++ | ++ |
| Gloss retention (%) after exposure to a | 88.5 | 93.5 | 92.3 | 84.7 | 91.1 |
| weather-O-meter for 100 hours (weatherability) | 98.1 | 98.6 | 97.7 | 95.7 | 97.6 |

It is seen from the results obtained that superior coated films can be obtained from compositions consisting of 100 parts of an aminoalkyd resin with 5 to 50 parts of a cyclopentadiene-derived hydrocarbon.

EXAMPLE 3

A mixture of dicyclopentadiene with vinyl acetate, allyl alcohol or methyl methacrylate was repeated in the same way as in Example 1. Using each of the cyclopentadiene-derived hydrocarbon resins, coated films were prepared and evaluated in the same way as in Example 1. The results are shown in Table 3.

Table 3

| Run No. | Invention | | | Comparison |
|---|---|---|---|---|
| | 1 | 2 | 3 | 4 |
| Dicyclopentadiene (parts) | 70 | 70 | 70 | 70 |
| Vinyl acetate | — | — | 30 | — |
| Allyl alcohol | 30 | — | — | — |
| Methyl methacrylate | — | 30 | — | — |
| Isoprene | — | — | — | 30 |
| Softening point (° C) | 90 | 128 | 97 | 95 |
| Properties of the coated films | | | | |
| Condition of the coated film | Good | Good | Good | Good |
| Crosscut tape test | 100/100 | 100/100 | 100/100 | 20/100 |
| Pencil hardness | 2H | 2H | 2H | 3H |
| Bending test | 3 | 3 | 3 | 10 (unacceptable) |
| Impact test Erichsen test | 1000×500 | 1000×300 | 1000×500 | 300×100 or below |
| Water resistance | 7.2 | 6.7 | 6.9 | less than 1.0 |
| Alkali resistance (5% Na₂CO₃ aqueous solution; 40° C × 2 days) | ++ | ++ | ++ | — |
| Gasoline resistance | ++ | ++ | ++ | — |
| Gloss (glossmeter) | ++ | ++ | ++ | — |
| | 92.2 | 90.3 | 89.4 | 32.1 |
| Gloss retention (%) after exposure to a weater-O-meterr for 300 hours (weatherability) | 98.5 | 97.7 | 97.9 | 95.2 |

The results show that aminoalkyd resin compositions containing hydrocarbon resins obtained by copolymerizing dicyclopentadiene with a monolefinic monomer containing a polar group such as vinyl acetate, methyl methacrylate or allyl alcohol exhibit superior properties, whereas aminoalkyl resin compositions containing hydrocarbon resins obtained by copolymerizing dicyclopentadiene with a non-polar monomer such as isoprene have poor compatability and afford coated films having very poor properties.

EXAMPLE 4

A cyclopentadiene-derived hydrocarbon resin was prepared by polymerizing a mixture of dicyclopentadiene with vinyl acetate or allyl alcohol. The resin obtained was mixed with an acrylic resin in accordance with the following formulation. The composition obtained was coated in the same way as in Example 1, allowed to stand at room temperature for 20 minutes, and baked in a heated oven at 150° C. for 30 minutes to form a cured coated film having a thickness of 30 + 3μ. The properties of the coated film was evaluated, and the results are shown in Table 4.

| Formulation | |
|---|---|
| Cyclopentadiene-derived hydrocarbon | 20 parts |
| Baking acrylic resin (*1) | 70 |
| Butylated melamine resin (*2) | 30 |
| Titanium oxide (*3) | 120 |
| Xylene | 160 |
| Solids content | 60 % |
| Vehicle/pigment | 1/1 |
| Aminoacrylic resin/cyclopentadiene-derived resin (weight ratio) | 100/20 |
| Acrylic resin/melamine resin (weight ratio) | 70/30 |

(*1) Acrydic A-405 (a product of Dainippon Ink and Chemicals, Inc.)
(*2) Superbeckasite J-820-60 (a product of Dainippon Ink and Chemicals, Inc.)
(*3) Tipake R-630 (a product of Ishihara Sangyo Co., Ltd.)

Table 4

| | Invention | | Comparison |
|---|---|---|---|
| Run No. | 1 | 2 | 3 |
| Dicyclopentadiene (parts) | 70 | 70 | — |
| Vinyl acetate | 30 | — | — |
| Allyl alcohol | — | 30 | — |
| Properties of the coated films | | | |
| Condition of the coated film | Good | Good | Good |
| Crosscut tape test | 100/100 | 100/100 | 60/100 |
| Pencil hardness | 3H | 3H | 3H |
| Bending test | 3 | 3 | 10 (unacceptable) |
| Impact test (½ inch × g × mm) | 1000×400 | 1000×400 | 500×400 |
| Erichsen test | 4.3 | 4.7 | 1.2 |
| Water resistance (40° C × 10 days) | ++ | ++ | ++ |
| Alkali resistance (5% Na$_2$CO$_3$ aq., 40° C × 10 days) | ++ | ++ | ++ |
| Resistance to gasoline (gasoline No. 2) | ++ | ++ | ++ |
| Gloss (glossmeter) (reflectance at 60° on the mirror surface) | 91.3 | 88.6 | 82.5 |
| Gloss retention (%) after exposure to a weather-O-meter for 100 hours (weatherability) | 98.2 | 98.4 | 98.0 |

It can be seen from the results obtained that when aminoacrylic resins are used as the thermosetting resin, the same results can be obtained as in the case of aminoalkyd resins.

What we claim is:

1. In a thermosetting coating composition containing at least one thermosetting aminoalkyd resin composed of 80 to 60% by weight of an alkyd resin and 20 to 40% by weight of an amino resin as a main ingredient of a vehicle, the improvement wherein the composition contains 100 parts by weight of the thermosetting aminoalkyd resin composition and 5 to 50 parts by weight of a cyclopentadiene-derived hydrocarbon resin having a softening point of 50° to 160° C. and obtained by heat polymerizing a mixture of 85 to 55% by weight of a cyclopentadiene-type monomer with 15 to 45% by weight of a polar monolefinic monomer copolymerizable therewith wherein the cyclopentadiene-type monomer is cyclopentadiene, methyl cyclopentadiene, or a dimer, trimer or codimer of any of these.

2. The improved thermosetting coating composition of claim 1 wherein the polar monolefinic monomer is an unsaturated cyanide compound, an unsaturated chlorine compound, an unsaturated alcohol, a fatty acid ester of an unsaturated alcohol, an unsaturated carboxylic acid, an ester of an unsaturated carboxylic acid, an unsaturated aldehyde, or an unsaturated ether.

3. The improved thermosetting coating composition of claim 1 wherein the polar monolefinic monomer is vinyl acetate, allyl alcohol or methyl methacrylate.

4. The improved thermosetting composition of claim 1 which contains 10 to 30 parts by weight of said cyclopentadiene-derived hydrocarbon resin.

5. The improved thermosetting composition of claim 1 wherein the cyclopentadiene-derived hydrocarbon resin has a softening point of 60° to 100° C.

6. The improved thermosetting coating composition of claim 1 wherein the cyclopentadiene-derived hydrocarbon is obtained by heat polymerizing a mixture of 80 to 60 percent by weight of said cyclopentadiene-type monomer with 20 to 40 percent by weight of the said polar monolefinic monomer copolymerizable therewith.

7. The improved thermosetting coating composition of claim 4 wherein said cyclopentadiene-derived hydrocarbon resin has a softening point of 60 to 100° C. and is obtained by heat polymerizing a mixture of 80 to 60 percent by weight of said cyclopentadiene-type monomer and 20 to 40 percent by weight of said polar monolefinic monomer copolymerizable therewith.

8. The improved thermosetting coating composition of claim 7 wherein the polar monolefinic monomer is vinyl acetate, allyl alcohol or methyl methacrylate.

9. The improved thermosetting coating composition of claim 8 wherein the aminoalkyd resin is composed of 75 to 65 percent by weight of alkyd resin and 25 to 35 percent by weight of an amino resin.

10. The improved coating composition of claim 9 wherein said alkyd resin is a short oil or medium oil alkyd resin modified with coconut oil, rice bran oil, soybean oil, or linseed oil and said amino resin is a butylated melamine resin, butylated benzoguanamine resin or butylated urea resin.

* * * * *